United States Patent
Bolger et al.

(10) Patent No.: US 7,620,139 B2
(45) Date of Patent: Nov. 17, 2009

(54) METHOD OF IMPROVING NUCLEAR REACTOR PERFORMANCE DURING REACTOR CORE OPERATION

(75) Inventors: Francis Bolger, Wilimington, NC (US); Jose Casillas, San Jose, CA (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 0 days.

(21) Appl. No.: 11/169,916

(22) Filed: Jun. 30, 2005

(65) Prior Publication Data

US 2007/0002997 A1    Jan. 4, 2007

(51) Int. Cl.
    *G21C 7/06* (2006.01)
(52) U.S. Cl. .................. 376/219; 376/217; 376/236; 376/245; 376/327
(58) Field of Classification Search ............. 376/154, 376/213, 217, 219, 224, 239, 244, 236, 245, 376/327
    See application file for complete search history.

(56) References Cited

U.S. PATENT DOCUMENTS

| 4,075,057 | A | * | 2/1978 | Fletcher et al. | ............... | 372/73 |
| 4,330,367 | A | * | 5/1982 | Musick | ................ | 376/245 |
| 5,790,616 | A | * | 8/1998 | Jackson | ................ | 376/245 |
| 5,912,933 | A | * | 6/1999 | Shaug et al. | ................ | 376/216 |
| 6,611,572 | B2 | * | 8/2003 | Bolger et al. | ............... | 376/216 |
| 6,862,329 | B1 | * | 3/2005 | Kropaczek et al. | .......... | 376/267 |
| 2004/0059549 | A1 | * | 3/2004 | Kropaczek et al. | ............. | 703/2 |

OTHER PUBLICATIONS

U.S. NRC Part 21 Report, Aug. 1995.*

* cited by examiner

*Primary Examiner*—Rick Palabrica
(74) *Attorney, Agent, or Firm*—Harness, Dickey & Pierce, PLC

(57) ABSTRACT

In the method, performance of a nuclear reactor may be improved by implementing an operational solution for the nuclear reactor using at least one control rod criteria in order to increase scram effectiveness during at least a portion of an operating cycle for the nuclear reactor.

4 Claims, 12 Drawing Sheets

(CONVENTIONAL ART)

(CONVENTIONAL ART)

(CONVENTIONAL ART)

METHOD OF IMPROVING NUCLEAR REACTOR PERFORMANCE DURING REACTOR CORE OPERATION

BACKGROUND OF THE INVENTION

1. Field of the Invention

The present invention is generally related to methods of improving nuclear reactor performance during core operation, and more particularly related to methods of improving reactor performance and of operating a core so as to increase a scram effectiveness.

2. Description of the Related Art

FIG. 1 is a schematic diagram of a simplified boiling water reactor (BWR); FIG. 2 is a cross-sectional diagram depicting a conventional arrangement of multiple fuel rod bundles within a core of a BWR. A BWR generates power from a controlled nuclear fission reaction. As shown in FIG. 1, a simplified BWR includes a reactor chamber 101 that contains a nuclear fuel core and water. Generated steam may be transferred through pipe 102 to turbine 103, where electric power is generated, then water returns to the core through pipe 104. As shown in FIG. 2, the core 201 is made of approximately five hundred (500) bundles 202 of fuel rods arranged in a given manner within the reactor core.

FIG. 3 is a schematic cross-sectional diagram of a conventional arrangement of fuel rods within a single fuel bundle. As shown in FIG. 3, each bundle 301 may contain roughly about one hundred (100) fuel rods 302. Water in the core surrounds the rods. Heat generated by a nuclear reaction is transferred from the rods to the water circulating through the core, boiling some of the water. The heat generated in the core may be controlled to maintain safe and efficient reactor operations.

In a BWR, there are basically three modes of heat transfer to be considered in defining thermal limits for the reactor: (i) Nucleate boiling, (ii) transition boiling and (iii) film boiling. "Nucleate boiling" is a desired efficient mode of heat transfer in which the BWR is designed to operate. "Transition boiling" is manifested by an unstable fuel rod cladding surface temperature which rises suddenly as steam blanketing of the heat transfer surface on the rod occurs. The fuel rod cladding surface temperature then drops to the nucleate boiling temperature as the steam blanket is swept away by the coolant flow, and then rises again. At still higher fuel rod/bundle operating powers, "film boiling" occurs, which results in higher fuel rod cladding surface temperatures. The cladding surface temperature in film boiling, and possibly the temperature peaks in transition boiling, may reach values which could cause weakening of the cladding and/or accelerated corrosion.

Fuel rod overheating may be generally defined as the onset of the transition from nucleate boiling to film boiling. The conventional basis for reactor core and fuel rod design is defined such that some "margin," accommodating various design and operational "uncertainties," is maintained between the most limiting operating condition and the transition boiling condition, at all times for the life of the core.

The onset of transition boiling can be predicted by a correlation to the steam quality at which boiling transition occurs, as which may be referred to as "critical quality." Steam quality can be readily measured and is generally a function of a given, measured distance above the boiling boundary (boiling length) for any given mass flow rate, power level, pressure and bundle flow geometry, among other factors. A "critical power" may be defined as that bundle power which would produce the critical quality of steam. Accordingly, a "critical power ratio" (CPR) may be defined as the ratio of the critical power to the bundle operating power at the reactor condition of interest. CPR may be descriptive of the relationship between normal operating conditions and conditions which produce a boiling transition. Conventionally, CPR is used to rate reactor design and operation in an effort to assure a safe and efficient operation of the reactor, the CPR is kept above a given value for each fuel assembly in the core. Reactor operating limits may be conventionally defined in terms of the most limiting fuel bundle assembly in the core, which may be defined as the "minimum critical power ratio" (MCPR). Reactor operating limits are typically stated in terms of MCPR.

In nuclear power generation engineering principles, it is widely recognized that there is a possibility, however small, that the occurrence of a reactor transient event, combined with the various "uncertainties" and tolerances inherent in reactor design and operation, may cause transition boiling to occur locally at a fuel rod for some given period of time. Accordingly, MCPR operating limits are conventionally set in accordance with a United States Nuclear Regulatory Commission (USNRC) design basis requirement that transients caused by a single operator error or a single equipment malfunction shall be limited such that, taking into consideration uncertainties in the core operating state, more than 99.9% of the fuel rods may be expected to avoid boiling transition during that error or malfunction. A safety limit minimum critical power ratio (SLMCPR) is defined under current USNRC requirements as the MCPR where no more than 0.1% of the fuel rods are subject to boiling transition (also known as NRSBT for Number of Rods Subject to Boiling Transition). The corresponding operating limit MCPR (OLMCPR) describes the core operating conditions such that the MCPR is not lower than the SLMCPR to a certain statistical confidence.

During operation of a reactor core, of a BWR, for example, nuclear power production may be controlled in part by control rods. Generally, the control rods may be moved to a deeper position in the core to reduce reactivity in the reactor, or moved further out from the core center or bottom to increase reactivity in the reactor. A scram operation involves the rapid insertion of substantial negative reactivity, usually via spring or hydraulic-assisted injection, of all control rods in the core to a fully inserted position. A reactor scram reduces the fission process within the core to thereby reduce power production. A reactor scram may be initiated automatically by a reactor protection system or manually by a reactor operator, for example.

A scram is generally least effective when control rods are either fully inserted in the core or fully withdrawn from the core. In the case where the control rods are fully inserted in the core, the scram target condition has already been met; thus, initiating a scram will not change the reactivity of the core. Namely, this is because all rods are already fully inserted. In the case where the control rods are fully withdrawn from the core, a rate at which the scram reduces reactivity in the core is lowest, since the control rods traverse the longest possible distance (i.e., the distance between full withdrawal and insertion). In other words, once initiated, the scram requires a longer period of time with fully withdrawn control rods.

The reactivity in the core is generally lowest at the end of operating cycle (EOC), which may be the period prior to a planned maintenance outage for the reactor. For this reason, control rods in conventional reactors are typically fully removed from the core at EOC, so as to attain the highest available level of reactivity. However, a reactor scram may be required during the EOC. A scram initiated at EOC may be less effective because the control rods may be fully withdrawn. For this reason, the OLMCPR at EOC may be set at a higher level, due to the decreased rate of power reduction during a scram at EOC.

SUMMARY OF THE INVENTION

An example embodiment of the present invention is directed to a method of improving nuclear reactor performance, including implementing an operational solution for the nuclear reactor using at least one control rod criteria in order to increase scram effectiveness during at least a portion of an operating cycle for the nuclear reactor. For example, the at least one control rod criteria may include a consideration of a partial insertion of control rods during the portion of the operating cycle.

BRIEF DESCRIPTION OF THE DRAWINGS

The example embodiments of the present invention will become more fully understood from the detailed description given herein below and the accompanying drawings, wherein like elements are represented by like reference numerals, which are given by way of illustration only and thus are not limiting to the example embodiments of the present invention.

DETAILED DESCRIPTION OF THE EXAMPLE EMBODIMENTS OF THE PRESENT INVENTION

In an effort to place the example embodiments of the present invention into context, a general example method for determining control rod insertion during an operating cycle will be described, prior to describing example methods of simulation.

General Method of Selecting Control Rods for Partial Insertion

Figure 12:
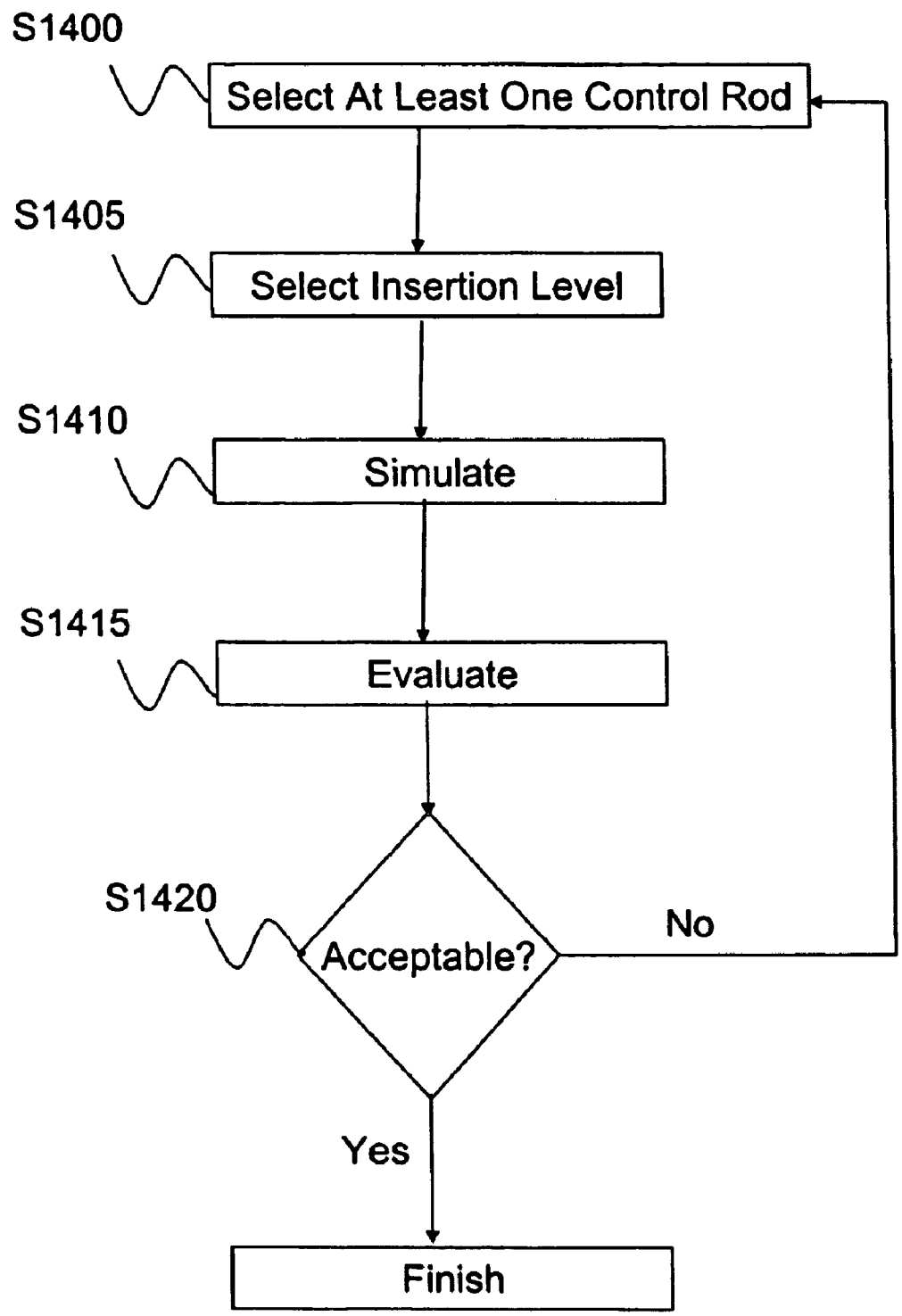
FIG. 12 is a flow chart illustrating a process for determining control rod insertion during an operating cycle of a nuclear reactor according to an example embodiment of the present invention.

FIG. 12 is a flow chart illustrating a process for determining control rod insertion during an operating cycle of a nuclear reactor, according to an example embodiment of the present invention. For example, the process of FIG. 12 may be applied at an end of operating cycle (EOC). As such, the following example embodiment given with respect to FIG. 12 illustrates the process as applied at the EOC. However, it is understood that example embodiments of the present invention are not limited to employment at the EOC, but rather may further be employed at any portion of an operating cycle.

Referring to FIG. 12, a user (e.g., a core designer) selects (S1400) at least one control rod to consider for partial insertion in the core at EOC. The user may employ well-known methodologies in making the control rod selection, as is evident to one of ordinary skill in the art. The set of possible control rods for selection may be all control rods in the reactor.

For example, control rod selection may be based on information in an operational plan. The operational plan may typically set forth the control rod movements during sequences for a next cycle of operation, for example. In one example, the user selects the control rods which are removed latest from the core (e.g., in a last control rod sequence) according to the operational plan. The latest removed control rods are typically the control rods which may absorb the most reactivity at EOC. Thus, the control rods which may absorb the most reactivity at the EOC may be selected.

The user may select a partial-degree of insertion (S1405) at which to simulate the selected control rods. The user may employ experience and/or well-known methods to select the degree of insertion for which to simulate the control rods selected as S1400, as is evident to one of ordinary skill in the art.

The selected control rods from S1400 may be simulated (S1410) at the selected degree of insertion (S1405) for the duration of an operation cycle (e.g., including EOC). Example methods of performing this simulation (e.g., trial and error, direct calculation, 3D modeling—SLMCPR Addition, 3D modeling—0.1% NRSBT, etc.) will be described in detail below. The simulation results may include a consideration of scram operation as well as a consideration of normal core operation at EOC.

The simulation result from S1410 may be compared (S1415) with desired performance criteria. An example of desired performance criteria may be an operating limit minimum core power ratio (OLMCPR), although the example embodiments may use other desired performance criteria such as peak fuel centerline temperature, as is known to one of ordinary skill in the art. The susceptibility to boiling transition during the transient may be quantified statistically as either (1) the probability that a single rod in the core is susceptible to boiling transition or (2) the expected fraction of total rods in the core susceptible to boiling transition. Such a statistical relationship is possible because each individual trial value of NRSBT has been determined by summing the probabilities that individual fuel rods have CPR values less than 1.0 during the transient. In an example, the nominal value for each NRSBT distribution may be associated with the distribution of initial rod CPR values for all fuel rods in the core. By this process, a relationship can be established between the minimal initial MCPR value for all fuel rods in the core, and the probability and confidence level that the fuel rods will be susceptible to boiling transition during the transient. The minimal initial MCPR value for the core, when using the probability and confidence level established by the USNRC design basis requirement for the number of rods not susceptible to boiling transition during the AOO transient, is by definition the minimum Operating Limit MCPR required to demonstrate compliance with the USNRC.

Alternatively, at S1415, the user (e.g., a core designer) may employ his or her experience to determine whether the simulation results from S1410 indicate an acceptable or improved solution at EOC.

Based on the evaluation in S1415, the user determines (S1420) whether to continue the above-described process with the consideration of other parameters (e.g., other control rods and/or degrees of insertion). If the user determines the simulated solution is acceptable (output of S1420 is "Yes"), the process ends and the resultant partial insertion of the selected control rods may be implemented in the sequence designated in the operational plan (e.g., at a next cycle of operation). Alternatively, if the desired performance criteria is not met (output of S1420 is "No") and/or the user wishes to evaluate simulations with other parameters, the process proceeds back to S1400 and repeats with a different degree of insertion (S1405) and/or with a different selection of control rods (S1400).

SIMULATION EXAMPLES

Examples of simulating core operation will now be described. The examples described hereafter relate to a trial and error based method, a direct calculation, three dimensional (3D) modeling with SLMCPR addition and 3D modeling based on 0.1% NRSBT methods. While the simulation methods described below are directed to matching the NRSBT to 0.1%, it is understood that 0.1% is merely a safety standard set by the USNRC. Thus, alternatively, if the safety standard was based on another metric (e.g., as in Europe), similar methods may be employed to satisfy the other metric.

Trial and Error Method

In one example, the partial rod insertion may be tested during an actual operation of the nuclear reactor. Thus, referring to FIG. 12, after the user selects at least one control rod (S1400) and a given degree of insertion (S1405) for the selected control rod(s), the user may "simulate" the solution via actual implementation during reactor operation. Sensors in the reactor may store data associated with the core operation, which may be evaluated by the core designer at S1415.

Direct Calculation

Figure 1:
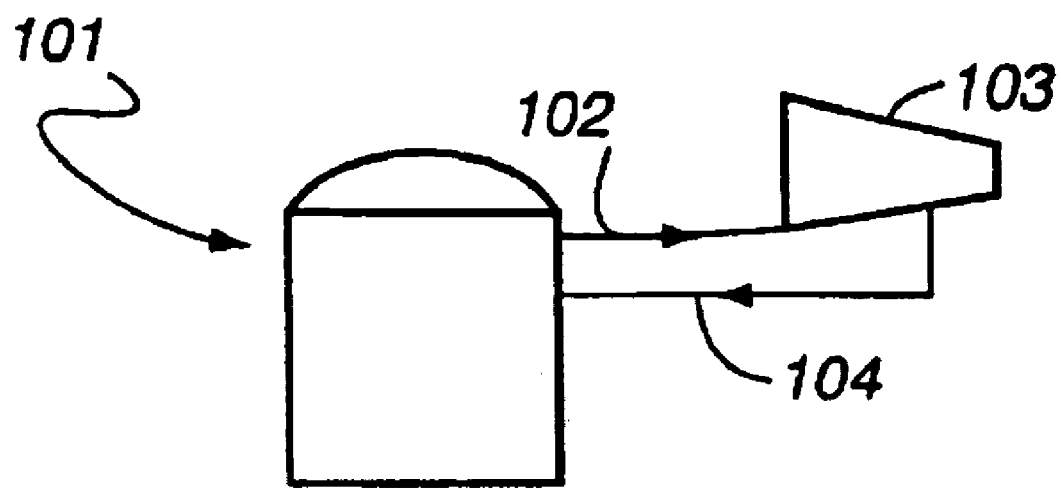
FIG. 1 is a schematic diagram of a simplified boiling water nuclear reactor.
Figure 2:
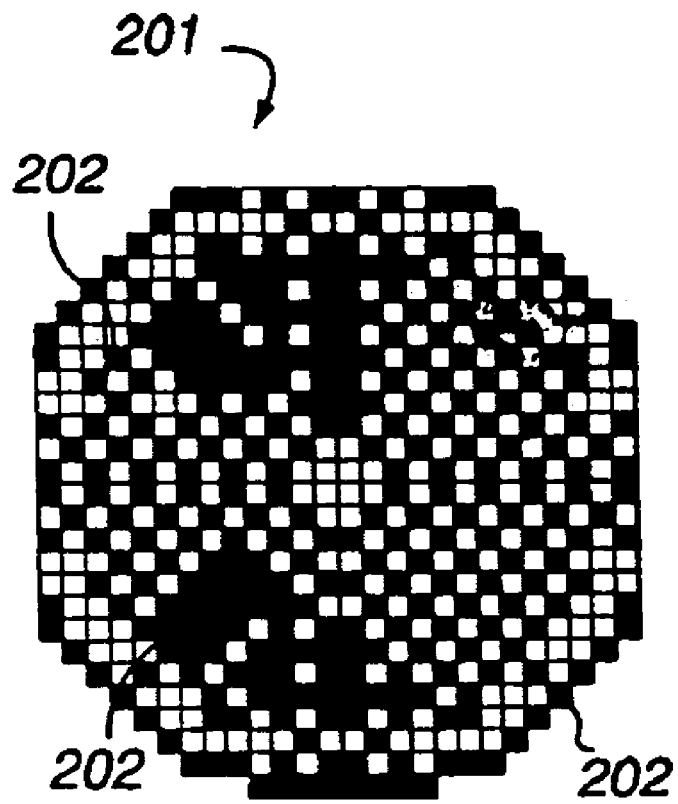
FIG. 2 is a cross-sectional diagram depicting a conventional arrangement of multiple fuel rod bundles within a core of a BWR.
Figure 3:
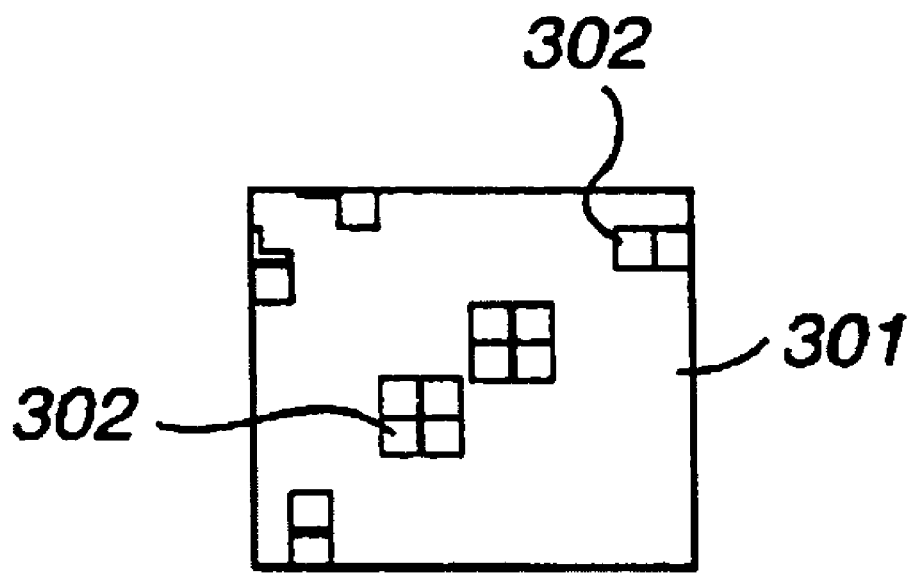
FIG. 3 is a schematic cross-sectional diagram of a conventional arrangement of fuel rods within a single fuel bundle.
Figure 4:
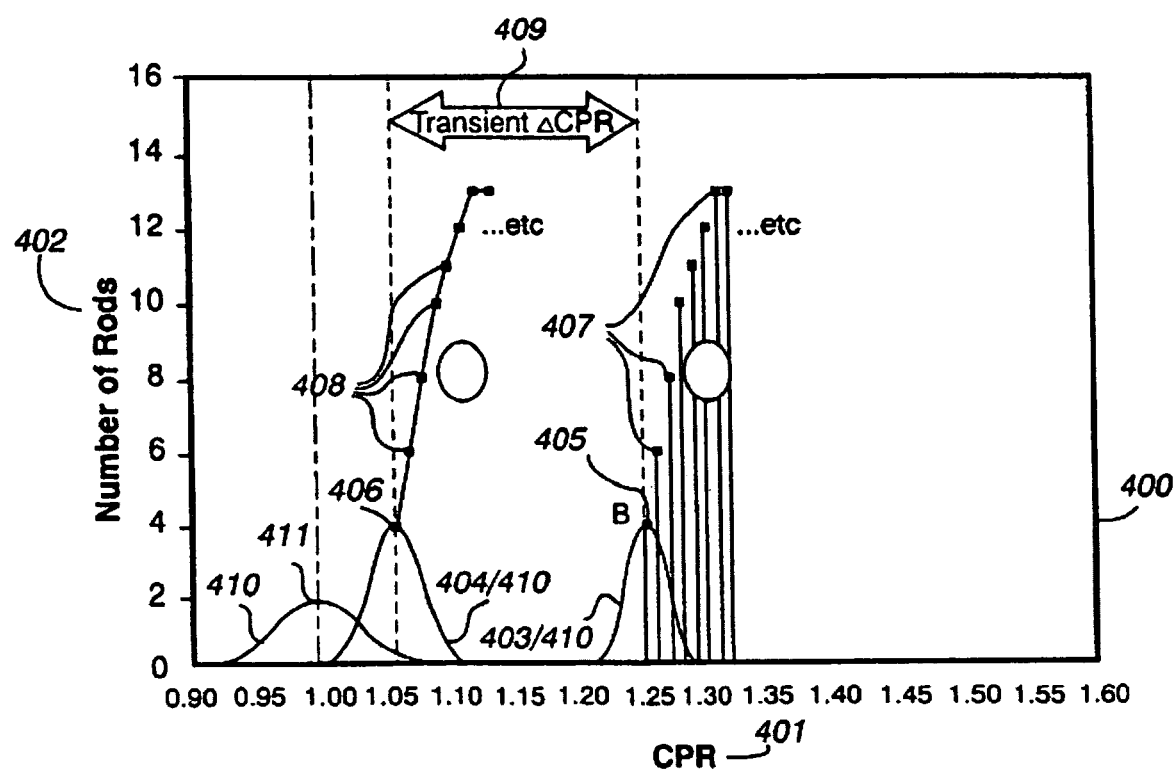
FIG. 4 is a graph showing the determination of the NRSBT according to an ideal process.

FIG. 4 is a graph showing the determination of the NRSBT according to an ideal process. In this direct calculation example, the OLMCPR may be calculated directly, so that for the limiting anticipated operational occurrence (AOO), less than 0.1% of the rods in the core would be expected to experience boiling transition. This approach is described in U.S. Pat. No. 5,912,933 to Shaug et al, for example. As shown in FIG. 4, there is a histogram 400 of rod CPR values 401 versus number of rods 402 at the specific CPR value. While the CPR value is usually associated with a fuel bundle, it actually refers to the limiting rod in a bundle. Each rod in the bundle has a CPR value that is determined by the local power distribution and relative position of the rod within the bundle (R-factor). The lowest CPR of any one rod in the bundle is used to characterize the CPR for the entire bundle.

The CPR 401 for a given rod has an associated probability distribution function (PDF) which reflects the uncertainties in its determination. The PDF may be determined experimentally and is shown as an Experimental Critical Power Ratio (ECPR) distribution 410. Thus, if a nominal CPR value (411) is 1.0, then the PDF 410 of probable actual CPR values range from 0.90 to 1.10. The variability in the rod CPR values is due to uncertainties in the initial rod condition, i.e., uncertainties in the measurements of parameters at the reactor operating state (core power) and in the modeling of derived parameters (power distribution).

In order to take the effect of a transient event on the CPR values into account, a safety margin may be introduced to CPR values by shifting the acceptable nominal CPR value 405 for the lowest rod CPR to a larger CPR value, i.e., 1.25. The ECPR histogram distribution 403 for the lowest CPR rod is thus shifted such that the entire CPR histogram is above a CPR value of 1.20, and well above a CPR value of 1.0. Moreover, the nominal CPR values 407 for rods other than the lowest CPR rod are above the nominal CPR value, e.g., 1.25, of the lowest CPR rod.

During a transient in rod operation, the histogram 407 of rod CPRs shifts to the left to lower CPR values, resulting in the histogram 408. With this shift, the "nominal" CPR value 406 during the transient is at the point, e.g., 1.05, where the minimum CPR value is reached during the transient. The limiting rod will have an associated PDF 404, which includes both the uncertainties in the initial rod conditions and "transient uncertainties." The maximum change in critical power ratio during the transient ("transient $\Delta$CPR 409") includes uncertainties in the modeling of the transient and/or uncertainties in both the physical models and plant parameters.

Figure 5:
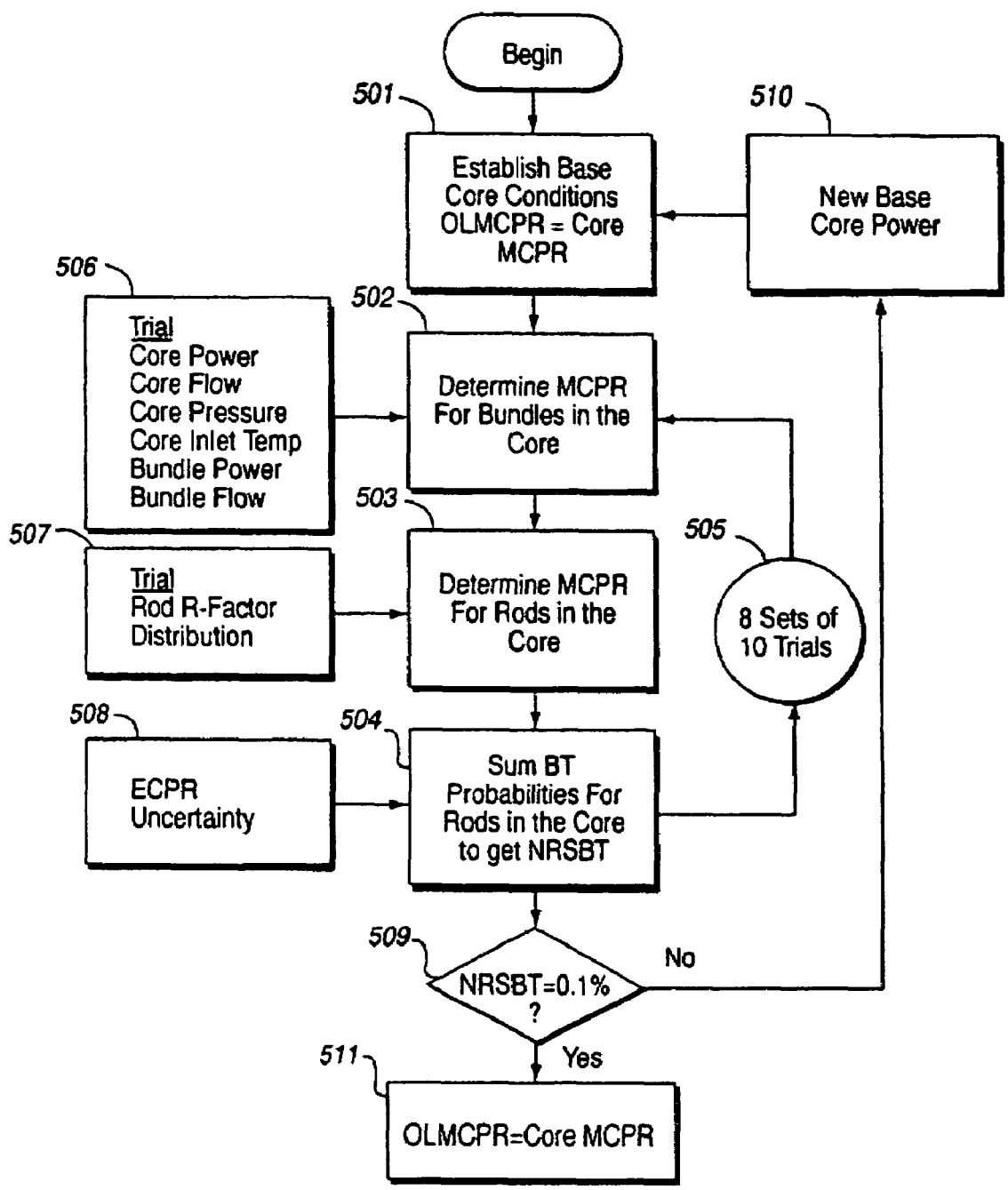
FIG. 5 is a flow chart illustrating a sequence of processing steps executable by a data processing system for performing an evaluation of OLMCPR using the ideal process.

FIG. 5 is a flow chart illustrating a sequence of processing steps executable by a data processing system for performing an evaluation of OLMCPR using the ideal process. FIG. 5 is described in detail in commonly-assigned U.S. Pat. No. 6,111,572 to Bolger et al., entitled "Determination of Operating Limit Minimum Critical Power Ratio", the entire relevant portion of which is incorporated by reference herein and described below.

In an example embodiment, this transient $\Delta$CPR 409 and associated OLMCPR may be generated as shown in FIG. 5, and described as follows.

Step 1: Assume a set of base core operating conditions using the parameters to run the plant that generates a core MCPR equal to the OLMCPR, as shown by block 501.

Step 2: Using the parameters, such as core power, core flow, core pressure, etc., that predict a general bundle CPR set forth in block 506, determine the MCPR for each bundle in the core, as shown by block 502.

Step 3: Using parameters, such as rod placement within each bundle and rod power, which change each bundle CPR into individual rod CPR values set forth in block 507, determine the MCPR for each rod in the core, as shown by block 503.

Step 4: Using the ECPR probability distribution, generated by Equations 1 and 2, set forth in block 508, determine the percentage of NRSBT in the core by summing the probabilities of each rod in the core that is subject to boiling transition, as shown by block 504. This summation may be shown by Equation 3.

$$ECPR = \frac{\text{(Critical Power Predicted by Correlation)}}{\text{(Measured Critical Power)}} \quad \text{Equation 1}$$

$$P_i = P(z_i) = \frac{1}{\sqrt{2\pi}} \int_{z_i}^{\infty} e^{\frac{1}{2}u^2} du \quad \text{Equation 2}$$

$$NRSBT(\%) = \frac{100}{N_{rod}} \times \sum_{i=1}^{N_{rod}} [P_i \times (1Rod)] \quad \text{Equation 3}$$

where $z_i$ indicates a rod operating at MCPR(i), u indicates (MCPR(i)-mean ECPR)/(ECPR standard deviation), $P_i$ and $P(z_i)$ indicate a probability that a rod i may experience boiling transition and Nrod indicates a total number of rods.

Step 5: Vary the parameters set forth in blocks 506 and 507 for a set number of Monte Carlo statistical trials, as shown by block 505. The Monte Carlo process is well-known in the art and is a general method of collecting data to be used in a simulation. The Monte Carlo method provides approximate solutions to a variety of mathematical problems by performing statistical sampling experiments (e.g., on a computer). The method typically applies to problems with no probabilistic content as well as to those with inherent probabilistic structure. Among all numerical methods that rely on N-point evaluations in M-dimensional space to produce an approximate solution, the Monte Carlo method may have an absolute error of estimate that decreases as N superscript −1/2 whereas, in the absence of exploitable special structure all others have errors that decrease as N superscript −1/M at best. Compile the statistics from all the trials from steps 2 through 4 to generate a probability distribution of NRSBT.

Step 6: Compare the value of NRSBT percentage to 0.1%, as shown in block 509. If the percentage is greater than 0.1%, reset the core parameters to different initial conditions in order to comply with the USNRC regulations, as shown in block 510. Similar to Step 1 and block 501, the new initial conditions are assumed to generate an OLMCPR. The determination of NRSBT restarts and loops until the value of NRSBT is equal to 0.1%. Similarly, if the percentage is less than 0.1%, the core parameters are reset to increase the value of NRSBT in order to operate the core more efficiently or with fewer effluents.

Step 7: If the percentage of NRSBT equals 0.1%, the assumed value of OLMCPR, which equals core MCPR, complies with the USNRC regulations, as shown by block 511. Accordingly, the operating core conditions are set as the assumed parameters.

While the above-described example assumes that the OLMCPR must meet the 0.1% standard, it is understood that, alternatively, the above-described example may be applied to any safety criteria.

3D Modeling—SLMCPR Addition

Figure 6:
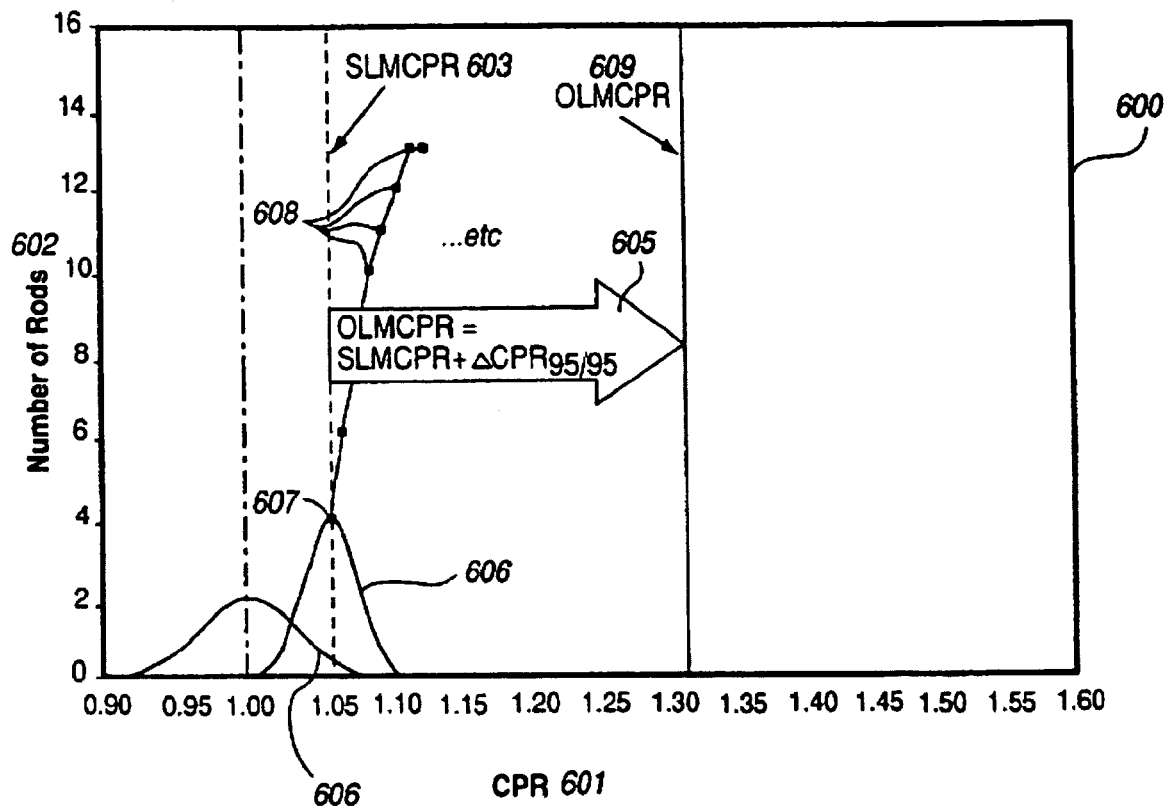
FIG. 6 is a graph showing the linear addition of $\Delta$CPR to the SLMCPR to determine operating limit minimum core power ratio (OLMCPR), which is the currently approved process.

FIG. 6 is a graph showing the linear addition of ΔCPR to the SLMCPR to determine operating limit minimum core power ratio (OLMCPR), which is the currently approved process. FIG. 6 is described in detail in commonly-assigned U.S. Pat. No. 6,111,572 to Bolger et al., entitled "Determination of Operating Limit Minimum Critical Power Ratio", the entire relevant portion of which is incorporated by reference herein and described below.

In the 3D modeling process with SLMCPR addition for determining simulation results, the OLMCPR determination is divided into two primary steps, as shown by FIG. 6. Using a process similar to the above-described direct calculation, first the SLMCPR is determined so that less than 0.1% of the rods in the core will be expected to experience boiling transition at this value. In other words, 99.9% of the fuel rods in the core will be expected to avoid boiling transition if the MCPR in the core is greater than SLMCPR. Second, the OLMCPR is then established by summing the maximum change in MCPR (as shown by an error factor $\Delta CPR_{95/95}$) expected from the most limiting transient event and the SLMCPR.

Since FIG. 6 is somewhat similar to the FIG. 4; thus, only a brief description of its components follows for purposes of brevity. Histogram 600 shows the number of rods at a specific CPR value 602 versus the corresponding CPR value 601. The histogram 608 results with the lowest CPR rod 607 at a value of, e.g., 1.05, which equals the SLMCPR 603. Limiting rod distribution 606 shows the uncertainty in determination of the limiting CPR rod 607. Similar to the above described direct calculation, the SLMCPR 603 is determined when the percentage of NRSBT is equal to 0.1%.

However, unlike the above-described direct calculation, the ID modeling process is unable to fully predict and measure certain parameters, such as the power distribution within each bundle and the power distribution along each rod. Thus, the uncertainties in calculating the SLMCPR do not allow equating the OLMCPR with the SLMCPR. Accordingly, the error factor, $\Delta CPR_{95/95}$ 605, is linearly added to the SLMCPR 603 to determine the OLMCPR 609. ΔCPR.sub.95/95 605 conservatively corrects for limitations in the calculation of the SLMCPR 603.

Figure 7:
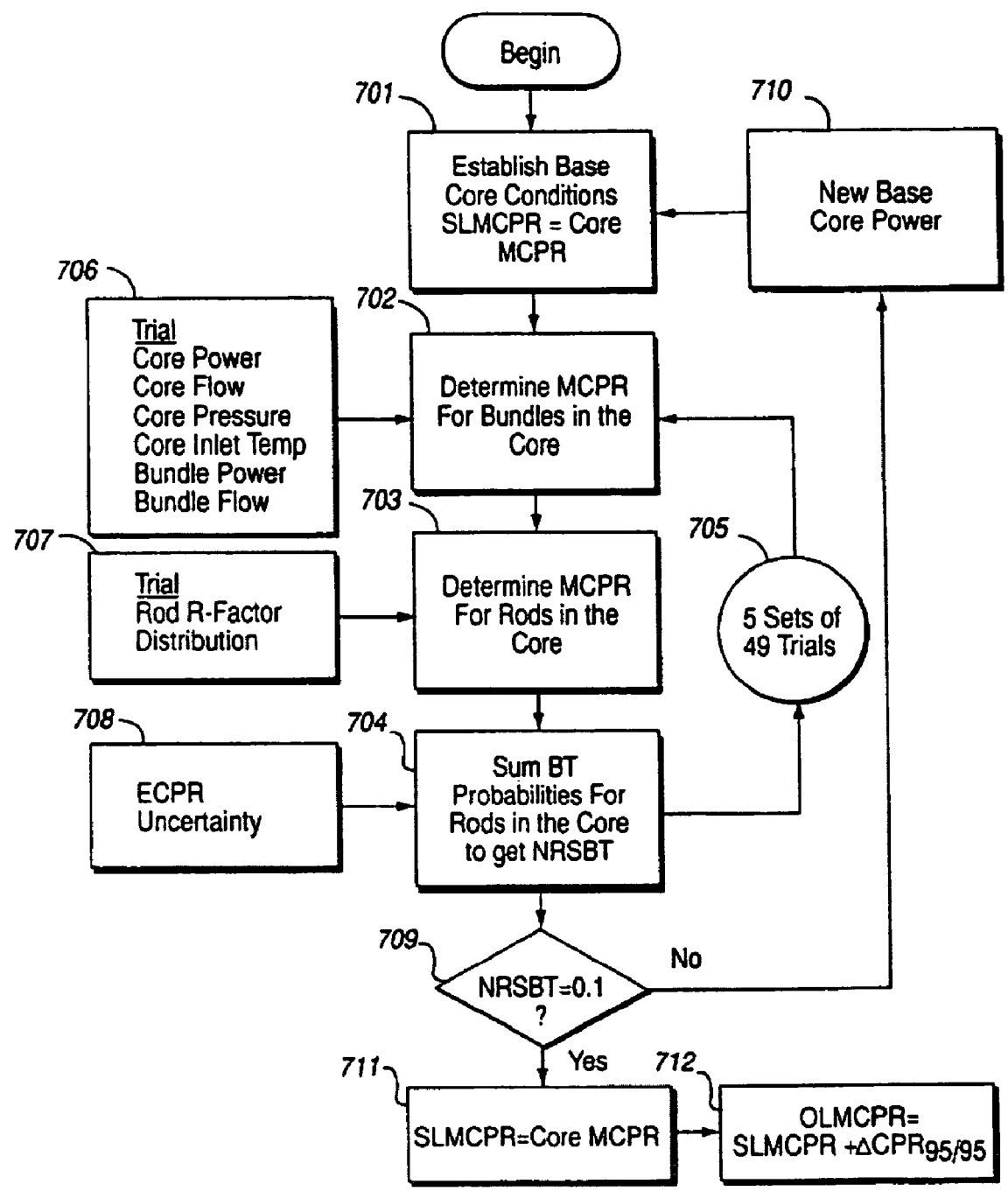
FIG. 7 is a flow chart illustrating a sequence of processing steps executable by a data processing system for performing a evaluation of the OLMCPR using the currently approved process.

FIG. 7 is a flow chart illustrating a sequence of processing steps executable by a data processing system for performing a evaluation of the OLMCPR using the currently approved process. FIG. 7 is described in detail in commonly-assigned U.S. Pat. No. 6,111,572 to Bolger et al., entitled "Determination of Operating Limit Minimum Critical Power Ratio", the entire relevant portion of which is incorporated by reference herein and described below.

Using the ID modeling process, the OLMCPR 609 is generated as shown in FIG. 7, and described as follows:

Step 1: Assume a set of base core operating conditions using the parameters to run the plant generates a core MCPR equal to the SLMCPR, as shown by block 701.

Step 2: Using the parameters, such as core power, core flow, core pressure, bundle power, etc., that predict a general bundle CPR set forth in block 706, determine the MCPR for each bundle in the core as shown by block 702. This process step may have large uncertainties in predicting the bundle power, potentially biasing the calculations.

Step 3: Using parameters, such as rod placement within each bundle and rod power, which change each bundle CPR into individual rod CPR values set forth in block 707, determine the MCPR for each rod in the core, as shown by block 703. Individual rod power may be difficult to measure; combining that uncertainty with bundle power distribution uncertainty serves to increase the uncertainty in practical calculations of the SLMCPR.

Step 4: Using the ECPR probability distribution set forth in block 708, generated by Equations 1 and 2 shown above, determine the percentage of NRSBT in the core by summing the probabilities of each rod in the core that is subject to boiling transition, as shown by block 704. This summation may be performed using Equation 3 from above.

Step 5: Vary the parameters set forth in blocks 706 and 707 for a set number of Monte Carlo statistical trials, as shown by block 705. Compile the statistics from all the trials from steps 2 through 4 to generate a probability distribution of NRSBT.

Step 6: Compare the value of percentage of NRSBT to 0.1%, as shown in block 709. If the percentage is greater than 0.1%, reset the core parameters to different initial conditions in order to comply with the USNRC regulations, as shown in block 710. Similar to Step 1 and block 701, the new initial conditions are assumed to generate the SLMCPR. The determination of NRSBT loops until the value of NRSBT is equal to 0.1%. Similarly, if the percentage is less than 0.1%, the core parameters are reset to increase the value of NRSBT in order to operate the core more efficiently.

Step 7: If the percentage of NRSBT equals 0.1%, the assumed value of SLMCPR, which equals core MCPR, is the limit at which the core may operate, as shown by block 711.

Step 8: Since this process includes relatively uncertain simulations in steps 2 and 3, as shown by blocks 702 and 703, the change in CPR is evaluated at a 95% confidence interval, $\Delta CPR_{95/95}$. The OLMCPR equals the linear addition of the SLMCPR to the $\Delta CPR_{95/95}$. The resulting value of the OLMCPR complies with the USNRC regulations.

3D Modeling—0.1% NRSBT

In this example of a 3D modeling process to attain simulation results, a generic bias may be calculated for a change in critical power ratio during a transient event ($\Delta CPR/ICPR$) and a resulting Probability Distribution Function (PDF) may be used to predict a more accurate OLMCPR without first calculating a SLMCPR. From a large number of experimental trials that take many factors into account, a PDF for a transient referred to as $\Delta CPR/ICPR$ is created and the standard deviation in $\Delta CPR/ICPR$ is determined for each transient event. A nominal $\Delta CPR/ICPR$ for the transient event starting from nominal initial conditions is also determined. Histograms of individual rod CPR values for the minimum point in the transient are created by drawing random values of initial CPR and transient $\Delta CPR/ICPR$ uncertainty. The initial critical power ratios (ICPR) are converted, or translated, to MCPRs by a common random value of $\Delta CPR/ICPR$. From the MCPR values, the percentage of NRSBT is calculated for each trial. If the percentage of NRSBT is greater than 0.1%, initial operating conditions are changed and the process is repeated until the NRSBT is equal to 0.1%.

The NRSBT distribution histogram is analyzed using statistical methods to determine a "central tendency" of the distribution. Typically the mean or median is used as a statistic to quantify central tendency. The value of this statistic is defined here as the nominal value. In the discussions that follow, examples are given where the mean value is chosen as the nominal value although the present invention is not limited to this choice. Use of the median value or the value of some other statistic for central tendency as the nominal value is also contemplated as part of the example embodiments of the present invention.

The uncertainty in the nominal value of the statistic that is used to quantify central tendency is expressed in terms of a "confidence interval" for the nominal value. A confidence interval is defined such that there is a specified probability (usually of 50% or greater) that the interval contains the nominal value. For example, a 95% probability that the interval bounds the mean, defines a 95% confidence interval for the mean. The specified probability used to establish this confidence interval is called the "level of confidence" or confidence level.

In accordance with one example, the present invention may include a system including a data processing apparatus programmed to execute specific routines for simulating BWR core operating conditions and for calculating and statistically demonstrating the OLMCPR of a reactor in accordance with the improved method of the present invention as described in detail below.

Figure 8:
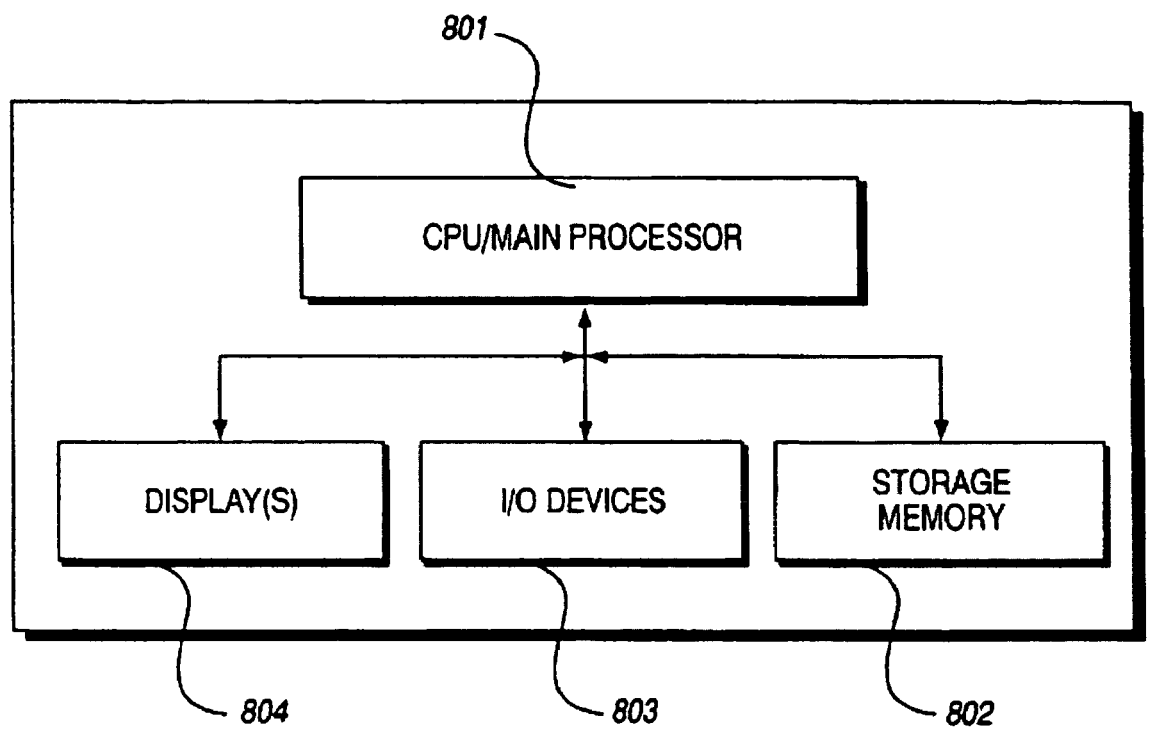
FIG. 8 is a block diagram of an example data processing system used for multi-dimension/modeling of BWR thermal hydraulics and indirect evaluation of an OLMCPR for a BWR in accordance with the present invention.

FIG. 8 shows a block diagram of an example data processing system, contemplated for performing the multi-dimensional simulation of reactor core transient response and for the direct evaluation of OLMCPR for a BWR reactor core in accordance with the example embodiments of the present invention. The system may include a central processing unit 801 (CPU), a storage memory 802, user interfacing I/O devices 803 and, optionally, one or more displays 804. Storage memory 802 may include a database (not shown) of reactor plant state information, parameter values and routines for implementing multi-dimensional simulations of core operating conditions and evaluating OLMCPR in accordance with the example method of the present invention as described herein below. For example storage memory 802 may include any well-known memory (e.g., a Read Only Memory (ROM), Random Access Memory (RAM), etc.)

A statistical study may be performed for each type of AOO, for each class of BWR plant type, and for each fuel type, for example to determine the generic transient bias and uncertainty in the $\Delta CPR/ICPR$. Enough trials (on the order of one hundred) are made starting with the nominal conditions, using random variations in the model and plant parameters. Uncertainties in initial conditions that contribute to the $\Delta CPR/ICPR$ (e.g., core power) are also included in the perturbations. The data are utilized to determine bias and standard deviation on the transient $\Delta CPR/ICPR$.

Figure 9:
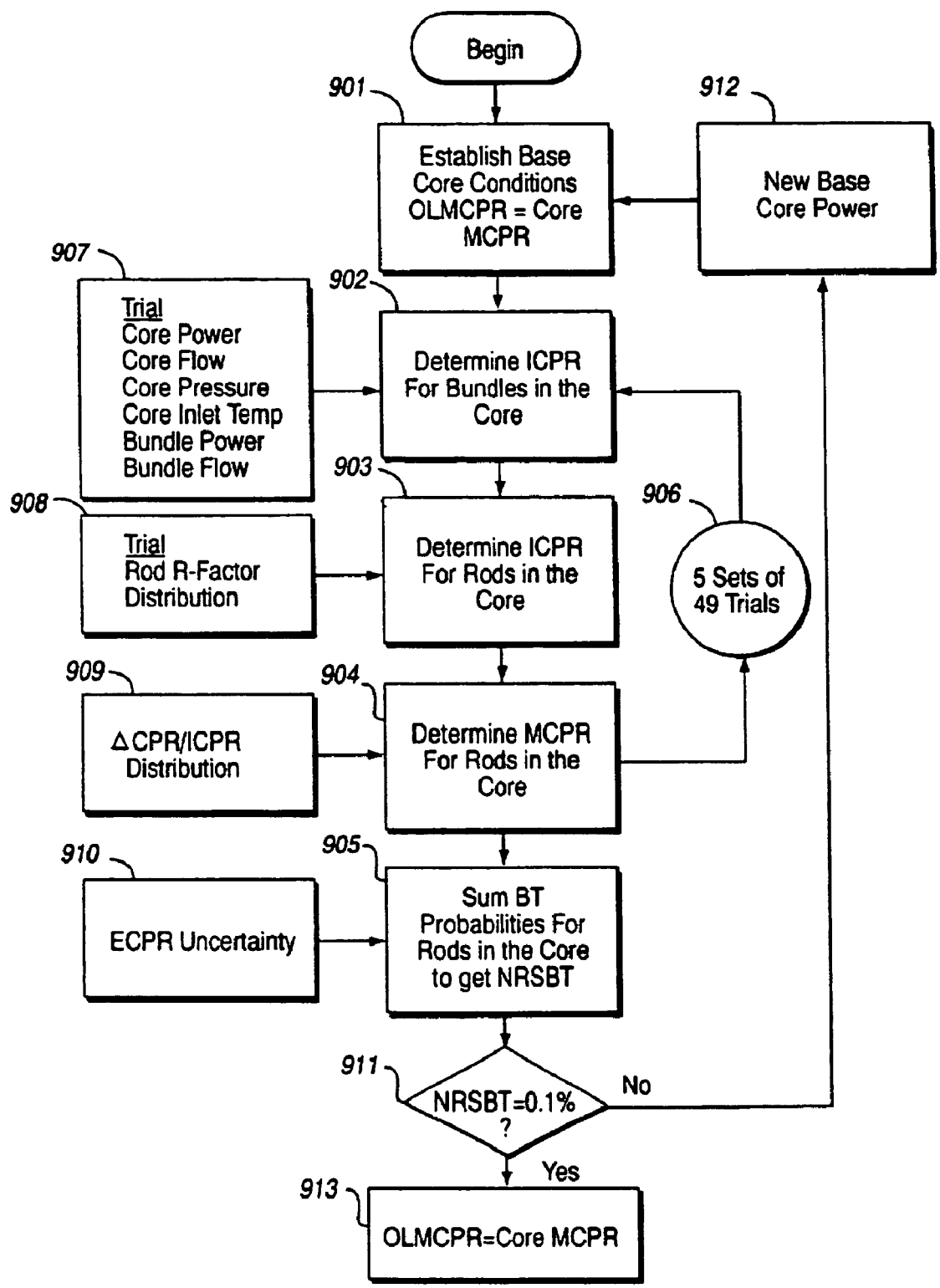
FIG. 9 is a flow chart illustrating a sequence of processing steps used in calculating the OLMCPR using the generic uncertainty in $\Delta$CPR/ICPR.

FIG. 9 is a flow chart illustrating a sequence of processing steps used in calculating the OLMCPR using the generic uncertainty in $\Delta CPR/ICPR$. FIG. 9 is described in detail in commonly-assigned U.S. Pat. No. 6,111,572 to Bolger et al., entitled "Determination of Operating Limit Minimum Critical Power Ratio", the entire relevant portion of which is incorporated by reference herein and described below.

A flow chart for an example process of the present invention is shown in FIG. 9. Block 909 remains unvaried throughout the calculation of the OLMCPR, and the $\Delta CPR/ICPR$ for individual transient events for each reactor type and fuel type must be determined before the process is used.

Figure 10:
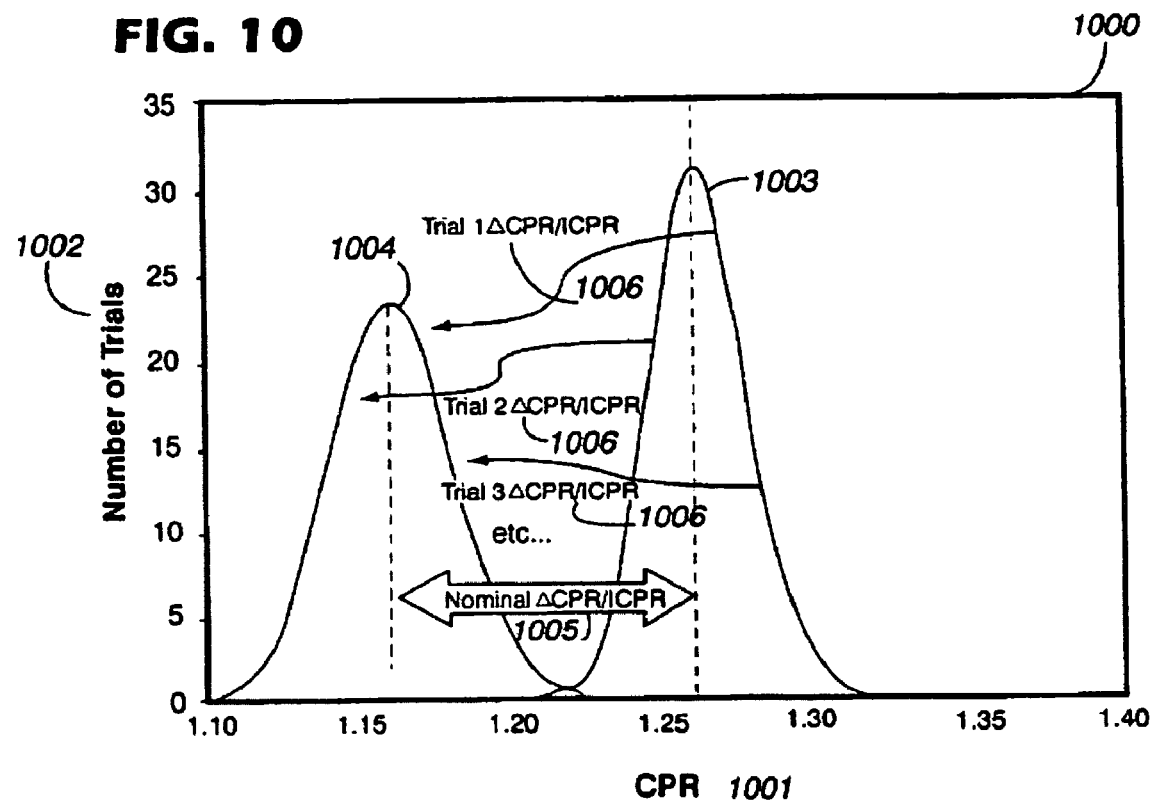
FIG. 10 is a graph showing the determination of generic uncertainty in $\Delta$CPR/ICPR using the present invention.

FIG. 10 is a graph showing the determination of generic uncertainty in $\Delta CPR/ICPR$ using the present invention. FIG. 10 is described in detail in commonly-assigned U.S. Pat. No. 6,111,572 to Bolger et al., entitled "Determination of Operating Limit Minimum Critical Power Ratio", the entire relevant portion of which is incorporated by reference herein and described below.

FIG. 10 shows the resulting graph of $\Delta CPR/ICPR$ for one specific type of AOO. Histogram 1000 shows the number of trials 1002 with a resulting CPR 1001 for each rod versus the corresponding CPR 1001 values. The PDF 1003 represents the distribution of CPR before the transient event. Each CPR value then changes according to individual $\Delta CPR/ICPR$ 1006 values. The aggregate of the transient CPR values yields the PDF 1004 during the transient event. The nominal $\Delta CPR/ICPR$ 1005 is defined to be the difference in the nominal CPR value of the PDF 1003 and the nominal CPR value of the PDF 1004. The calculation of the OLMCPR may be as follows.

Step 1: Assume a set of base core operating conditions using the parameters to run the plant generates a core MCPR equal to the OLMCPR as shown by block 901.

Step 2: Using the parameters, such as core power, core flow, core pressure, bundle power and others, that predict a general bundle CPR set forth in block 907, determine the ICPR for each bundle in the core, as shown by block 902.

Step 3: Using parameters, such as rod placement within each bundle and rod power distribution, that change each bundle CPR into individual rod CPR values set forth in block 908, determine the ICPR for each rod in the core, as shown by block 903.

Step 4: Using a randomly drawn individual ΔCPR/ICPR 1006 value from the graph of the appropriate transient represented in FIG. 10, MCPR values are projected for corresponding values of ICPR according to Equation 4.

Figure 11:
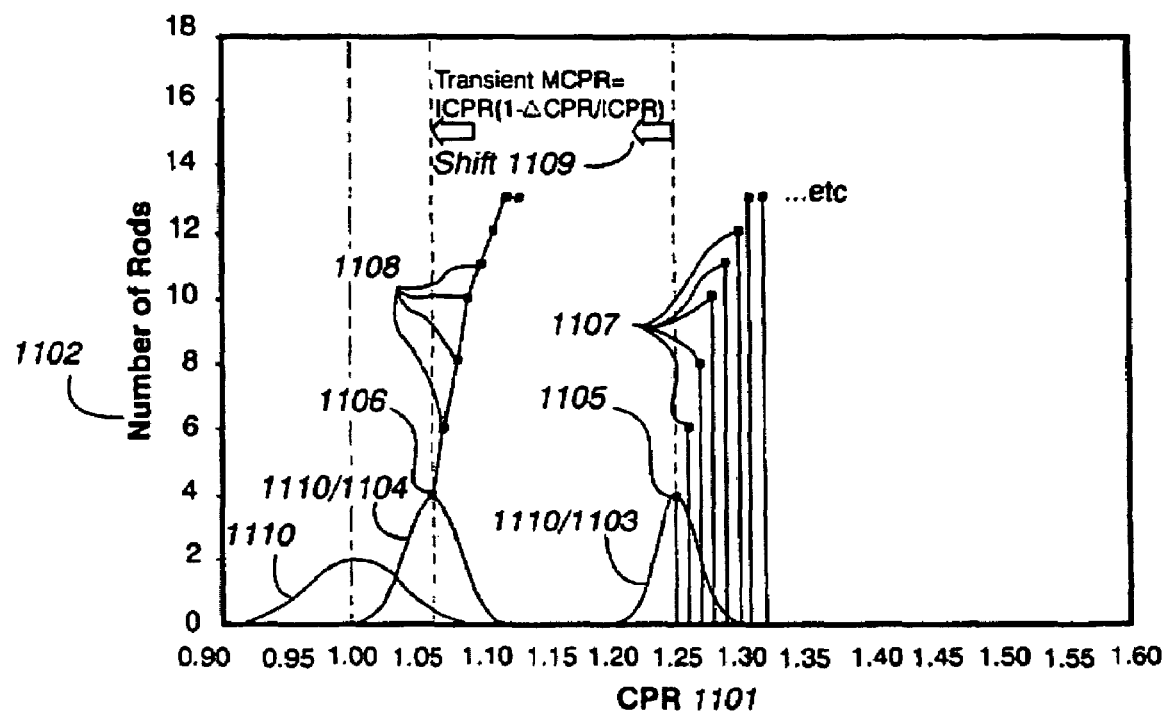
FIG. 11 is a graph showing the determination of the NRSBT using the generic uncertainty of $\Delta$CPR/ICPR.

FIG. 11 is a graph showing the determination of the NRSBT using the generic uncertainty of ΔCPR/ICPR. FIG. 11 is described in detail in commonly-assigned U.S. Pat. No. 6,111,572 to Bolger et al., entitled "Determination of Operating Limit Minimum Critical Power Ratio", the entire relevant portion of which is incorporated by reference herein and described below.

In FIG. 11, this process is represented by Shift 1109. Histogram 1100 shows the number of rods at a specific CPR value 1102 versus the corresponding CPR value 1101. The histogram 1107 is translated to histogram 1108 during the transient using a randomly selected ΔCPR/ICPR 1006 value. Lowest CPR value 1105 becomes lowest CPR value 1106, and lowest CPR rod PDF 1103 becomes lowest CPR rod 1104.

$$MCPR_i = ICPR_i \left(1 - \left(\frac{\Delta CPR}{ICPR}\right)_1\right) \quad \text{Equation 4}$$

Step 5: Using the ECPR probability distribution shown as PDF 1104 and set forth in block 910, determine the percentage of NRSBT in the core by summing the probabilities of each rod in the core that is subject to boiling transition as shown by block 905. This summation is performed using Equation 3, shown above.

Step 6: Vary the parameters set forth in blocks 907 and 908 for a set number of Monte Carlo statistical trials as shown by block 906. Compile the statistics from all the trials from steps 2 through 5 to generate a probability distribution of NRSBT.

Step 7: Compare the value of percentage of NRSBT to 0.1% as shown in block 911. If the percentage is greater than 0.1%, reset the core parameters to different initial conditions in order to comply with the USNRC regulations as shown in block 912. Similar to Step 1 and block 901, the new initial conditions are assumed to generate the OLMCPR. The determination of NRSBT restarts and runs until the value of NRSBT is equal to 0.1%. Similarly, if the percentage is less than 0.1%, the core parameters are reset to increase the value of NRSBT in order to operate the core more efficiently or to reduce effluents.

Step 8: If the percentage of NRSBT equals 0.1%, the assumed value of OLMCPR, which equals core MCPR, complies with the USNRC regulations as shown by block 913. Accordingly, the operating core conditions are set as the assumed parameters.

Example embodiments of the present invention being thus described, it will be obvious that the same may be varied in many ways. For example, while the simulation described with respect to S1410 of FIG. 12 has been described as being one of trial and error, direct calculation and 3D modeling methods, it is evident to one of ordinary skill in the art that any well-known simulation method may be employed to evaluate proposed solutions in consideration of rod placement during an operating cycle of a nuclear reactor (e.g., at the EOC). Further, while acceptable solutions have been described as being in accordance with the 0.1% OLMPCR standard, it is understood that the simulation results (S1410) may be evaluated (S1415) and deemed acceptable (S1420) based on any desired performance criteria. Further, while above described as being applied at the EOC, it is understood that other example embodiments of the present invention may be directed to any portion of an operating cycle for a nuclear reactor. Such variations are not to be regarded as a departure from the spirit and scope of the example embodiments of the present invention, and all such modifications as would be obvious to one skilled in the art are intended to be included within the scope of the following claims.

We claim:

1. A method of improving nuclear reactor performance, comprising:

implementing a control rod operational plan for the nuclear reactor, the control rod operational plan including a degree of partial insertion for a control rod in the nuclear reactor before a scram of the nuclear reactor, the control rod operational plan simulated in the nuclear reactor, the simulating including a scram during at least a portion of an operating cycle of the nuclear reactor including an end of an operating cycle, and the control rod operational plan decreasing an operating limit minimum core power ratio in the simulation for the scram during at least the portion of the operating cycle for the nuclear reactor including the end of cycle, compared to simulation results of the simulation of the nuclear reactor including a scram during at least a portion of an operating cycle of the nuclear reactor including an end of an operating cycle involving no insertion of the control rod in the nuclear reactor before a scram of the nuclear reactor.

2. The method of claim 1, wherein the control rod includes a control rod designated for a latest removal in the control rod operational plan.

3. A method of improving nuclear reactor performance, comprising:

generating a control rod operational plan for the nuclear reactor, the generating including selecting at least one control rod for consideration, selecting a degree of partial insertion for the selected control rod before a scram of the nuclear reactor, simulating the control rod operational plan, the simulating including a scram during at least a portion of an operating cycle of the nuclear reactor including an end of an operating cycle to generate a simulation result;

determining whether the simulation result decreases an operating limit minimum core power ratio in the simulation, compared to simulation results of a simulation of the nuclear reactor involving no insertion of the selected control rod in the nuclear reactor before a scram of the nuclear reactor; and implementing the generated control rod operational plan, if the determining step determines that the generated control rod operation plan decreases the operating limit minimum core power ratio compared to simulation results of the simulation of the nuclear reactor involving no insertion.

4. The method of claim 3, further comprising:

repeating the steps of claim 3 with a different at least one control rod or degree of partial insertion, if the determining step determines that the generated simulation result does not decrease the operating limit minimum core power ratio compared to simulation results of the simulation of the nuclear reactor involving no insertion.

* * * * *